United States Patent
Ono

(10) Patent No.: US 11,017,543 B2
(45) Date of Patent: May 25, 2021

(54) INSPECTION DEVICE

(71) Applicant: Keyence Corporation, Osaka (JP)

(72) Inventor: Shuhei Ono, Osaka (JP)

(73) Assignee: KEYENCE CORPORATION, Osaka (JP)

( * ) Notice: Subject to any disclaimer, the term of this patent is extended or adjusted under 35 U.S.C. 154(b) by 0 days.

(21) Appl. No.: 16/727,960

(22) Filed: Dec. 27, 2019

(65) Prior Publication Data

US 2020/0258245 A1 Aug. 13, 2020

(30) Foreign Application Priority Data

Feb. 8, 2019 (JP) .............................. JP2019-021808

(51) Int. Cl.
*G06T 7/521* (2017.01)
*G06T 7/529* (2017.01)

(52) U.S. Cl.
CPC .............. *G06T 7/521* (2017.01); *G06T 7/529* (2017.01); *G06T 2207/10028* (2013.01); *G06T 2207/30108* (2013.01)

(58) Field of Classification Search
CPC ..................... G06T 7/521; G06T 7/529; G06T 2207/30108; G06T 2207/10028; G06T 2207/10152; G06T 2207/20221; G06T 2207/30164; G06T 7/001; G06T 7/586
USPC .......................................................... 382/106
See application file for complete search history.

(56) References Cited

U.S. PATENT DOCUMENTS

| 6,618,123 B2 * | 9/2003 | Uomori ................. G01S 7/4815 348/131 |
| 2019/0362549 A1 * | 11/2019 | Impera ..................... G06T 7/187 |
| 2020/0033119 A1 * | 1/2020 | Ohnishi ............. G01B 11/2527 |

FOREIGN PATENT DOCUMENTS

JP 2015045587 A 3/2015

OTHER PUBLICATIONS

U.S. Appl. No. 16/727,957, filed Dec. 27, 2019 (71 pages).
U.S. Appl. No. 16/727,961, filed Dec. 27, 2019 (68 pages).

* cited by examiner

*Primary Examiner* — Amandeep Saini
(74) *Attorney, Agent, or Firm* — Kilyk & Bowersox, P.L.L.C.

(57) ABSTRACT

An imaging part 120 successively generates a plurality of pieces of pattern image data. The binning processing is executed to the plurality of pieces of the pattern image data generated by the imaging part 120, and a computing processing part 132 generates, on the basis of the plurality of pieces of the pattern image data after the binning processing, height data indicating a height image of the measurement target S. The imaging part 120 generates texture image data indicating an image of the measurement target S when the illuminating part 110 irradiates the measurement target S with uniform light. On the basis of the height data generated by the computing processing part 132 and the texture image data generated by the imaging part 120, an inspecting part 230 executes an inspection of the measurement target S.

5 Claims, 10 Drawing Sheets

INSPECTION DEVICE

CROSS-REFERENCE TO RELATED APPLICATIONS

The present application claims foreign priority based on Japanese Patent Application No. 2019-021808, filed Feb. 8, 2019, the contents of which is incorporated herein by reference.

BACKGROUND OF THE INVENTION

1. Field of the Invention

The present invention relates to an inspection device that inspects the height of a measurement target.

2. Description of Related Art

In an inspection device of a triangulation method, a light projecting part irradiates a surface of a measurement target with light, and a light receiving part including one-dimensionally or two-dimensionally arranged pixels receives the reflected light. Height data indicating a height image of the measurement target is generated on the basis of data on a received light amount distribution that is obtained by the light receiving part. Such height data is used in order to inspect (in-line inspect) the height of produced measurement targets in production sites such as factories in some cases.

For example, in a three-dimensional image processing device of JP-A-2015-45587, a measurement target is conveyed by a belt conveyor, and a light projection unit irradiates the measurement target with light many times at a prescribed position. Moreover, an imaging part receives each reflected light from the measurement target, whereby the measurement target is imaged.

Height data (height image) on the measurement target is generated on the basis of a plurality of pieces of image data on the measurement target. A prescribed inspection is executed on the basis of the generated height image.

In the abovementioned in-line inspection, in a state where the conveyance of the measurement targets by the belt conveyor is stopped in a certain period of time so as to bring the measurement target to a standstill at a prescribed position, the measurement target is irradiated by light many times, and the measurement target is imaged many times.

Accordingly, height data is generated, and a prescribed inspection is executed on the basis of the generated height image. Here, when a long period of time is required for the inspection, the stop time of the conveyance of the measurement targets becomes longer, and the production efficiency of the measurement targets is lowered. Accordingly, it is requested to perform a highly stable and highly accurate inspection, at high speed. However, it is not easy to attain both of the stability and high-speed property, and the accuracy, which have a trade-off relation.

SUMMARY OF THE INVENTION

An object of the present invention is to provide an inspection device capable of making a highly stable and highly accurate inspection of a measurement target at high speed.

(1) An inspection device according to the present invention is provided with: a structured-light illuminating part configured to irradiate a measurement target with structured light having a cyclical pattern while shifting a phase, a plurality of times; a uniform-light illuminating part configured to irradiate the measurement target with uniform light; an imaging part configured to successively generate, by successively receiving the structured light reflected from the measurement target, a plurality of pieces of pattern image data indicating an image of the measurement target, and generate, by receiving the uniform light reflected from the measurement target, texture image data indicating an image of the measurement target; a computing processing part configured to generate, binning processing being executed to the plurality of pieces of the pattern image data generated by the imaging part, on the basis of the plurality of pieces of the pattern image data after the binning processing, height data indicating a height image of the measurement target; and an inspecting part configured to execute, on the basis of the height data generated by the computing processing part or the texture image data generated by the imaging part, an inspection of the measurement target.

In this inspection device, the structured-light illuminating part irradiates the measurement target with structured light having a cyclical pattern a plurality of times while shifting a phase. By successively receiving the structured light reflected from the measurement target, the imaging part successively generates a plurality of pieces of pattern image data indicating an image of the measurement target. The binning processing is executed to the plurality of pieces of the pattern image data generated by the imaging part, and the computing processing part generates, on the basis of the plurality of pieces of the pattern image data after the binning processing, height data indicating a height image of the measurement target.

Moreover, the uniform-light illuminating part irradiates the measurement target with uniform light. By receiving the uniform light reflected from the measurement target, the imaging part generates texture image data indicating an image of the measurement target. On the basis of the height data generated by the computing processing part and the texture image data generated by the imaging part, the inspecting part executes an inspection of the measurement target.

With this configuration, in the height data, values of a plurality of pixels are averaged due to the binning processing, so that an S/N (signal/noise) ratio is improved. Moreover, the speed-up generation of height data is attained due to the binning processing. In contrast, in the texture image data, the high resolution is maintained. Moreover, in the inspection, a large number of pieces of texture image data do not need to be used. Accordingly, using the height data or the texture image data as appropriate makes it possible to make the highly stable and highly accurate inspection of the measurement target at high speed.

(2) The inspecting part may inspect the measurement target by associating the height data generated by the computing processing part with the texture image data generated by the imaging part. In this case, associating the height data with the texture image data makes it possible to make the highly stable and highly accurate inspection of a desired portion in the measurement target, at high speed.

(3) The inspecting part may execute the inspection of the measurement target, at an inspection related to a height direction, on the basis of the height data generated by the computing processing part, and execute the inspection of the measurement target, at an inspection related to a horizontal direction orthogonal to the height direction, on the basis of the texture image data generated by the imaging part.

In this case, using the height data makes it possible to make the inspection related to the height direction with high stability and at high speed. Moreover, using the texture image data makes it possible to make the inspection related to the horizontal direction with high accuracy and at high speed.

(4) The inspecting part may inspect the measurement target by acquiring reference data indicating the image of the measurement target as a reference image, receiving specifying of a measurement point on the reference image, identifying the measurement point in the texture image data or the height data by comparing the reference image data with the texture image data generated by the imaging part, and measuring the identified measurement point.

In this case, on the basis of the measurement point received on the reference image, it is possible to easily make the inspection of a prescribed portion in the measurement target. Moreover, the texture image data with high resolution is compared with the reference image data, so that it is possible to identify the measurement point with high accuracy. Accordingly, it is possible to make the inspection of the measurement target with higher accuracy.

(5) The computing processing part may divide each of original pixels of the height data into a plurality of divided pixels, and may determine pixel values of the plurality of the divided pixels, while weighting a pixel value of each original pixel, by distributing the weighted pixel values to the divided pixels of the relevant original pixel and the divided pixels in a surrounding of the relevant original pixel. In this case, it is possible to improve the resolution in the height data. Accordingly, even when the height data is used, it is possible to make the inspection of the measurement target with higher accuracy.

(6) The computing processing part may assign a first pixel value obtained by weighting the pixel value of the relevant original pixel with a first coefficient, to the plurality of the divided pixels in each original pixel of the height data, and may assign a second pixel value obtained by weighting the pixel value of the relevant original pixel with a second coefficient smaller than the first coefficient, to the divided pixels in the surrounding of the relevant original pixel. In this case, it is possible to easily improve the resolution in the height data.

(7) The computing processing part may divide each original pixel of the height data into a plurality of divided pixels to make a size of each of the divided pixels equivalent to a size of a pixel of the pattern image data before the binning processing. In this case, it is possible to improve the resolution in the height data to the same extent of that in the texture image data. Moreover, the number of divided pixels in the height data is easily made to match the number of pixels in the texture image data. This makes it easy to make the inspection of the measurement target by combining the height data with the texture image data.

According to the present invention, the highly stable and highly accurate inspection of the measurement target can be made at high speed.

DESCRIPTION OF EMBODIMENTS

An inspection device according to one embodiment of the present invention is explained below with reference to the drawings.

(1) Configuration of Inspection Device

Figure 1:
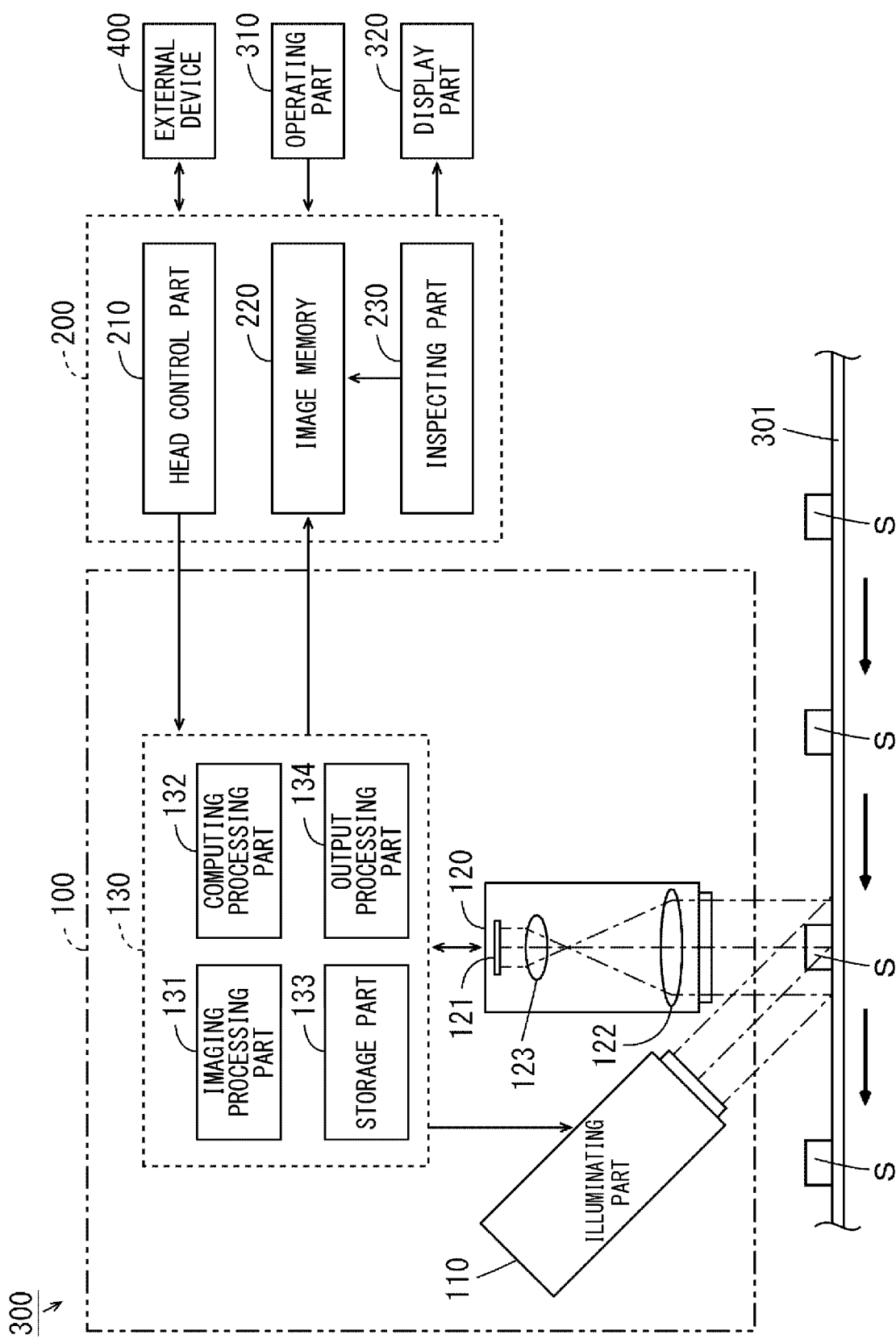
FIG. 1 is a block diagram illustrating a configuration of an inspection device according to one embodiment of the present invention.

FIG. 1 is a block diagram illustrating a configuration of an inspection device according to one embodiment of the present invention. As illustrated in FIG. 1, an inspection device 300 is provided with a head part 100, a controller part 200, an operating part 310, and a display part 320. The controller part 200 is connected an external device 400 such as a programmable logic controller.

As thick arrows illustrate in FIG. 1, a plurality of measurement targets S are successively conveyed by a belt conveyor 301 so as to pass through a space below the head part 100. When each of the measurement targets S passes through the space below the head part 100, the belt conveyor 301 stops in a certain period of time such that the relevant measurement target S temporarily halts at a prescribed position below the head part 100.

The head part 100 is, for example, a light-emitting and light-receiving integrated imaging device, and includes an illuminating part 110, an imaging part 120, and a computing part 130. The illuminating part 110 is configured to allow selective irradiation of light between the light of red, blue, green, or white that has an arbitrary pattern, and the light of red, blue, green, or white that has no pattern and is uniform, to the measurement target S from an obliquely upward direction. Hereinafter, the light that has an arbitrary pattern is referred to as structured light, and light that is uniform is referred to as uniform light. The configuration of the illuminating part 110 is described later.

The imaging part 120 includes an imaging element 121, and light receiving lenses 122 and 123. The light reflected upward by the measurement target S is condensed and image-formed by the light receiving lenses 122 and 123 of the imaging part 120, and is thereafter received by the imaging element 121. The imaging element 121 is, for example, a monochrome charge coupled device (CCD), and outputs analog electric signals corresponding to the light receiving amount from respective pixels, thereby generating image data. The imaging element 121 may be another imaging element such as a complementary metal oxide semiconductor (CMOS) image sensor.

In the following explanation, image data indicating an image of the measurement target S when the measurement target S is irradiated with structured light is referred to as pattern image data. Meanwhile, image data indicating an image of the measurement target S when the measurement target S is irradiated with uniform light is referred to as texture image data.

The computing part 130 is implemented by a field programmable gate array (FPGA), for example, and includes an imaging processing part 131, a computing processing part 132, a storage part 133, and an output processing part 134. In the present embodiment, the computing part 130 is implement by an FPGA, but the present invention is not limited thereto. The computing part 130 may be implemented by a central computing processing device (CPU) and a random access memory (RAM), or may be implemented by a micro computer.

The imaging processing part 131 controls operations of the illuminating part 110 and the imaging part 120. The computing processing part 132 generates, on the basis of a plurality of pieces of pattern image data, height data indicating a height image of the measurement target S. The storage part 133 temporarily stores therein the plurality of pieces of the pattern image data and the texture image data generated by the imaging part 120, and temporarily stores therein the height data generated by the computing processing part 132. The output processing part 134 outputs the height data or the texture image data stored in the storage part 133. Details of the computing part 130 are described later.

The controller part 200 includes a head control part 210, an image memory 220, and an inspecting part 230. The head control part 210 controls an operation of the head part 100, on the basis of a command given by the external device 400. The image memory 220 stores therein the height data or the texture image data output by the computing part 130.

The inspecting part 230 executes processing, such as edge detection or size measurement, with respect to the height data or the texture image data stored in the image memory 220, on the basis of an inspection content specified by a user. Moreover, the inspecting part 230 determines the quality of the measurement target S by comparing a measured value with a prescribed threshold, and provides a determination result to the external device 400.

The operating part 310 and the display part 320 are connected to the controller part 200. The operating part 310 includes a key board, a pointing device, or a dedicated console. As pointing device, a mouse, a joystick, or the like is used. The user can specify a desired inspection content to the controller part 200 by operating the operating part 310.

The display part 320 includes, for example, a liquid crystal display (LCD) panel or an organic electroluminescent (EL) panel. The display part 320 displays a height image and the like based on the height data stored in the image memory 220. Moreover, the display part 320 displays the determination result of the measurement target S by the inspecting part 230.

Figure 2:
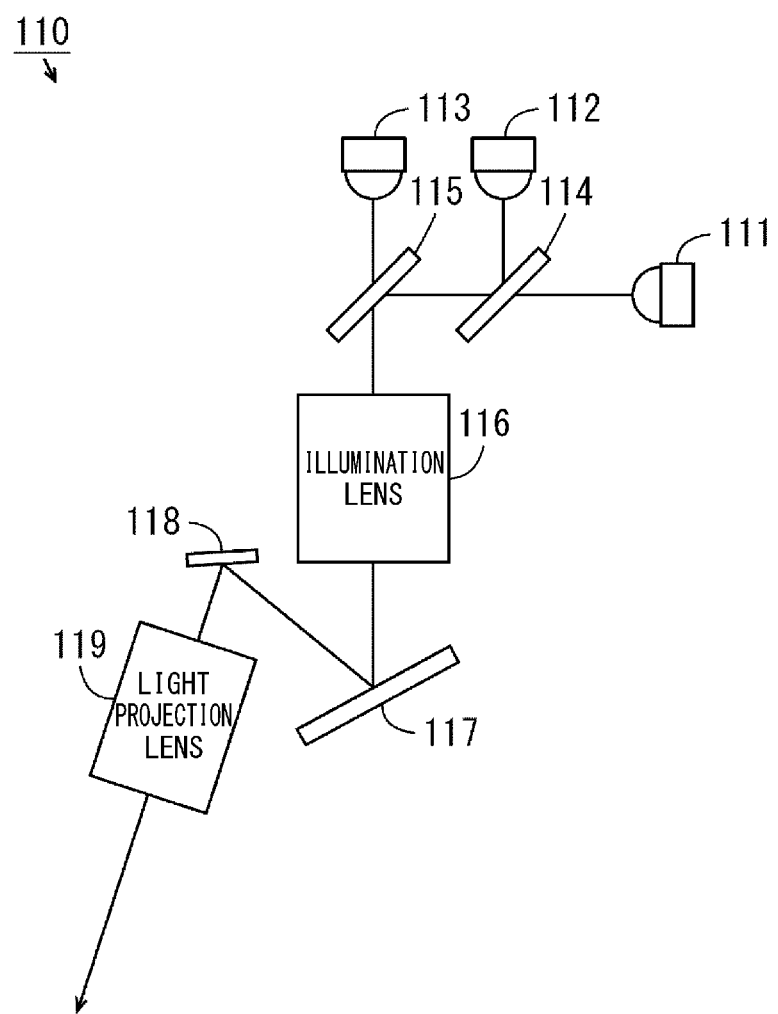
FIG. 2 is a diagram illustrating one example of a configuration of an illuminating part in FIG. 1.

FIG. 2 is a diagram illustrating one example of the configuration of the illuminating part 110 in FIG. 1. As illustrated in FIG. 2, the illuminating part 110 includes light sources 111, 112, and 113, dichroic mirrors 114 and 115, an illumination lens 116, a mirror 117, a pattern generating part 118, and a light projection lens 119. The light sources 111, 112, and 113 are, for example, light emitting diodes (LEDs), and respectively emit green light, blue light, and red light. Each of the light sources 111 to 113 may be a light source other than the LED.

The dichroic mirror 114 is disposed so as to allow the green light emitted by the light source 111 and the light emitted by the light source 112 to be superimposed on each other. The dichroic mirror 115 is disposed so as to allow the light superimposed by the dichroic mirror 114 and the red light emitted by the light source 113 to be superimposed on each other. This superimposes the light respectively emitted by the light sources 111 to 113 on a common optical path, which allows white light to be generated.

The illumination lens 116 condenses light passed through or reflected from the dichroic mirror 115. The mirror 117 reflects the light condensed by the illumination lens 116 onto the pattern generating part 118. The pattern generating part 118 is, for example, a digital micro-mirror device (DMD), and applies an arbitrary pattern to the entered light. The pattern generating part 118 may be an LCD or a reflective liquid crystal element (LCOS). The light projection lens 119 makes the light from the pattern generating part 118 parallel, and irradiates the measurement target S in FIG. 1 with the light.

The computing part 130 in FIG. 1 individually controls the emission of light from the light sources 111 to 113. This allows the illuminating part 110 to selectively emit light of red, green, blue, or white. Moreover, the computing part 130 controls the pattern generating part 118 such that a desired pattern is assigned to the light emit from the illuminating part 110. This allows the illuminating part 110 to selectively emit structured light and uniform light.

(2) Generation of Height Data

In the inspection device 300, a unique three-dimensional coordinate system (hereinafter, referred to as a device coordinate system) is defined to the head part 100. The device coordinate system in this example includes an origin point, and an X axis, a Y axis, and a Z axis that are orthogonal to one another. In the following explanation, a direction parallel to the X axis of the device coordinate system is referred to as an X direction, a direction parallel to the Y axis thereof is referred to as a Y direction, and a direction parallel to the Z axis thereof is referred to as a Z direction. The X direction and the Y direction are orthogonal to each other in a plane parallel to a top face (hereinafter, referred to as reference plane) of the belt conveyor 301. The Z direction is orthogonal to the reference plane.

Figure 3:
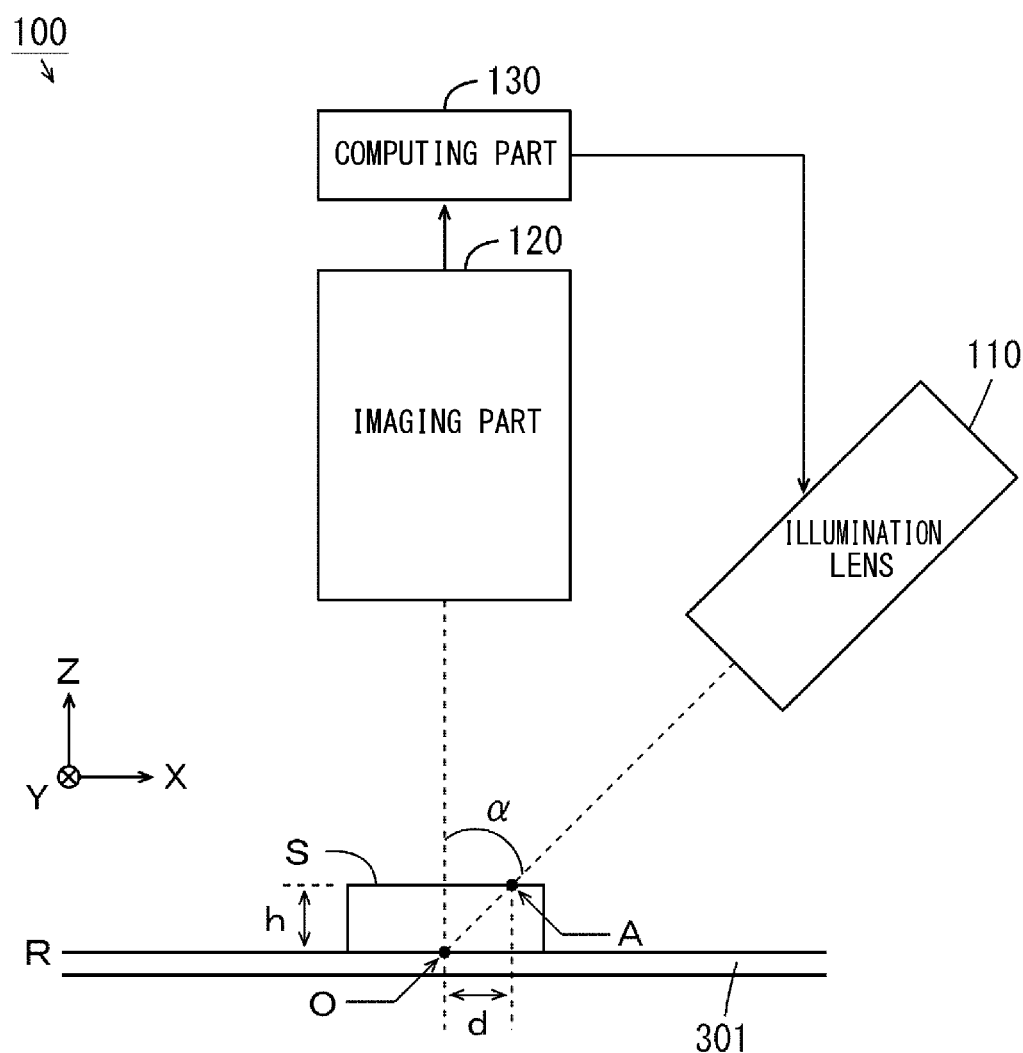
FIG. 3 is a diagram for explaining a principle of a triangulation method.

In the head part 100, height data indicating a height image of the measurement target S is generated by the triangulation method. FIG. 3 is a diagram for explaining a principle of the triangulation method. In FIG. 3, the X direction, the Y direction, and the Z direction are respectively illustrated as arrows. As illustrated in FIG. 3, an angle α between an optical axis of light that is emitted from the illuminating part 110 and an optical axis of light that enters the imaging part 120 is set in advance. The angle α is larger than 0 degree and smaller than 90 degrees.

When no measurement target S is present below the head part 100, the light that is emitted from the illuminating part 110 is reflected by a point O on a reference plane R, and enters the imaging part 120. In contrast, when the measurement target S is present below the head part 100, the light that is emitted from the illuminating part 110 is reflected by a point A on a surface of the measurement target S, and enters the imaging part 120. This causes the measurement target S to be imaged, and image data indicating an image of the measurement target S to be generated.

When a distance between the point O and the point A in the X direction is set as d, a height h of the point A in the measurement target S relative to the reference plane R is given by h=d=tan(a). The computing part 130 calculates the distance d on the basis of the image data generated by the imaging part 120. Moreover, the computing part 130 calculates the height h of the point A on the surface of the measurement target S, on the basis of the calculated distance d. By calculating heights of all the points on the surface of the measurement target S, it is possible to identify coordinates, which are indicated by the device coordinate system, for all the points to which the light has been irradiated. With the identification, height data of the measurement target S is generated.

In order to irradiate all the points on the surface of the measurement target S with light, various types of structured light are emitted from the illuminating part 110. In the present embodiment, the illuminating part 110 emits, a plurality of times, striped structured light (hereinafter, referred to as striped light) having linear cross-sections that are parallel to the Y direction and arranged in the X direction while a spatial phase thereof being changed. Moreover, the illuminating part 110 emits, a plurality of times, coded structured light (hereinafter, referred to as coded light) having linear cross-sections that are parallel to the Y direction and having bright portions and dark portions being arranged in the X direction, while the bright portions and the dark portions being changed to gray coded light.

(3) Inspection Processing

Figure 4:
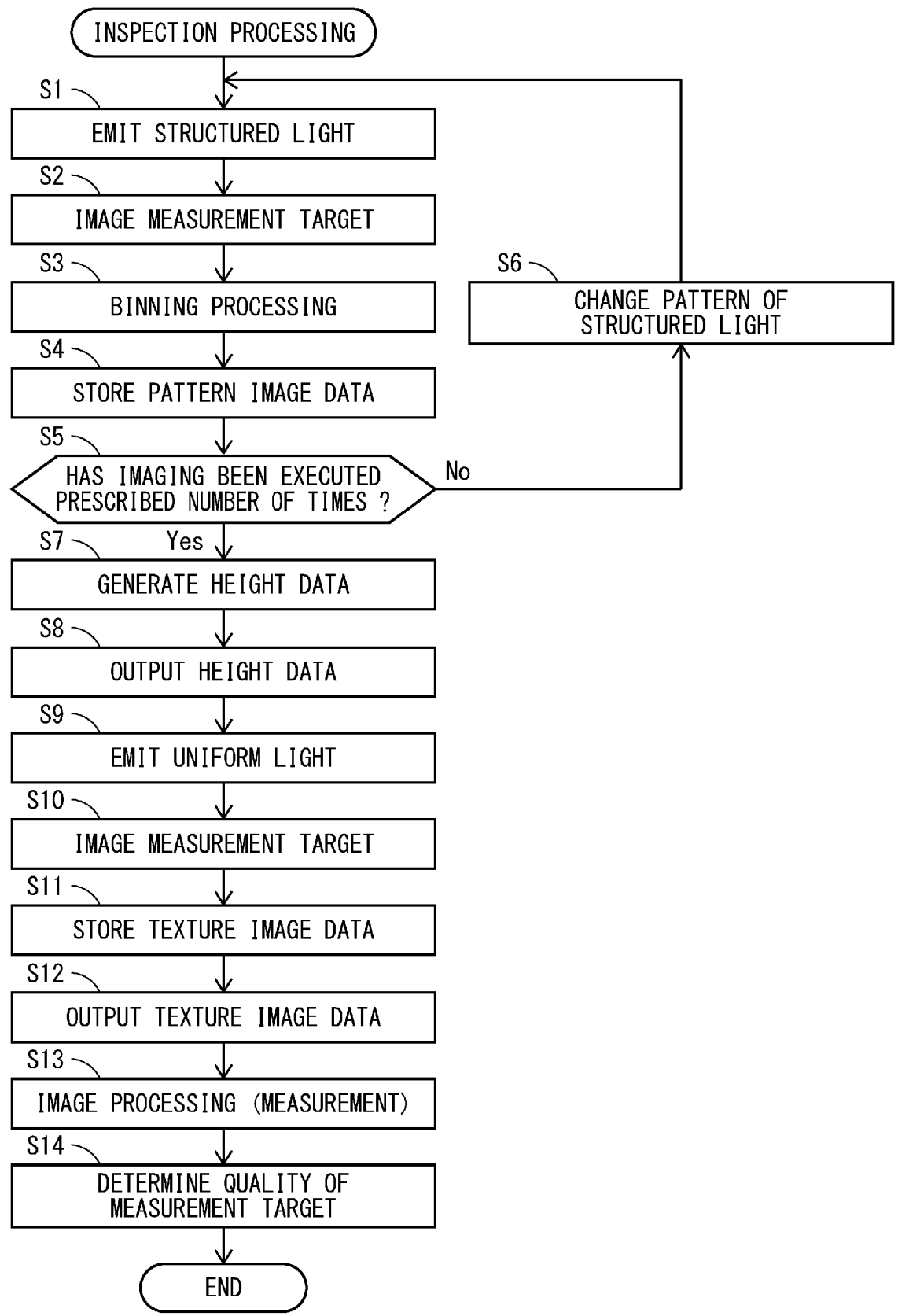
FIG. 4 is a flowchart illustrating one example of an algorithm of inspection processing that is executed by the inspection device in FIG. 1.

FIG. 4 is a flowchart illustrating one example of an algorithm of inspection processing that is executed by the inspection device 300 in FIG. 1. Hereinafter, the inspection processing is explained using the inspection device 300 in FIG. 1 and the flowchart in FIG. 4. Firstly, in the head part 100, the imaging processing part 131 controls the illuminating part 110 so as to emit structured light having a prescribed pattern (Step S1). Moreover, the imaging processing part 131 controls the imaging part 120 so as to image the measurement target S, in synchronization with the emission of the structured light at Step S1 (Step S2). Accordingly, the imaging part 120 generates pattern image data of the measurement target S.

Next, the imaging processing part 131 executes binning processing to the pattern image data generated at Step S2 (Step S3). This can reduce the data amount and the number of pixels of the pattern image data. In the present embodiment, the binning processing is executed such that four pixels arranged in so-called two rows and two columns constitute one pixel. Note that, a pixel value of each pixel after the binning is, for example, an average of four pixel values respectively corresponding to the four pixels that constitute the relevant pixel.

Thereafter, the imaging processing part 131 causes the storage part 133 to store therein the binning-processed pattern image data (Step S4). The data amount of the pattern image data has been reduced at Step S4, so that the imaging processing part 131 can cause the storage part 133 to store therein the pattern image data at high speed.

Subsequently, the imaging processing part 131 determines whether imaging has been executed a prescribed number of times (Step S5). If the imaging has not been executed a prescribed number of times, the imaging processing part 131 controls the pattern generating part 118 in FIG. 2 so as to change the pattern of the structured light (Step S6), and causes the processing to return to Step S1. Before the imaging has been executed a prescribed number of times, the processes at Steps S1 to S6 are repeated. Accordingly, a plurality of pieces of pattern image data when the measurement target S is successively irradiated by striped light and coded light while the pattern being changed are stored in the storage part 133. Note that, either of the striped light and the coded light may be emit first.

If imaging has been executed a prescribed number of times at Step S5, the computing processing part 132 generates height data, by performing a computation with respect to the plurality of pieces of the pattern image data stored in the storage part 133 (Step S7). The number of pixels of the pattern image data has been reduced at Step S7, so that the computing processing part 132 can generate height data at high speed. Thereafter, the output processing part 134 outputs the height data generated at Step S7 to the controller part 200 (Step S8). Accordingly, the height data is accumulated in the image memory 220 of the controller part 200.

Next, the imaging processing part 131 controls the illuminating part 110 so as to emit uniform light of white (Step S9). Moreover, the imaging processing part 131 controls the imaging part 120 so as to image the measurement target S, in synchronization with the emission of the uniform light at Step S9 (Step S10). Accordingly, the imaging part 120 generates texture image data of the measurement target S. Note that, in the present embodiment, the binning processing is not executed to the texture image data. Accordingly, texture image data with high resolution is generated.

Subsequently, the imaging processing part 131 causes the storage part 133 to store therein the texture image data generated at Step S10 (Step S11). Thereafter, the output processing part 134 outputs the texture image data stored at Step S11, to the controller part 200 (Step S12). Accordingly, the texture image data is accumulated in the image memory 220 of the controller part 200.

In the present embodiment, the uniform light of white is emitted at Step S9, but the present invention is not limited thereto. At Step S9, among uniform light of red, uniform light of green, and uniform light of blue, any one of uniform light may be emitted. Alternatively, at Step S9, among uniform light of red, uniform light of green, and uniform light of blue, two or more pieces of uniform light may be successively emitted. In this case, every time when any of uniform light is emitted at Step S9, the processes at Steps S10 to S12 are executed by corresponding to the uniform light.

Next, in the controller part 200, the inspecting part 230 executes the image processing to the height data or the texture image data accumulated in the image memory 220 at Step S8 or S12 (Step S13). Accordingly, on the basis of the inspection content specified in advance by the user, the measurement for a prescribed portion in the height data or the texture image data is executed. Specifically, the measurement related to the height direction (Z direction) is performed using the height data, and the measurement related to the horizontal direction (X direction or Y direction) is performed using the height data.

Here, in the height data, values of the plurality of the pixels are averaged due to the binning processing, so that an S/N (signal/noise) ratio is improved. Moreover, the speed-up generation of height data is attained due to the binning processing. Accordingly, using the height data makes it possible to perform the measurement related to the height direction with high stability and at high speed. In contrast, in the texture image data, the binning processing is not performed, and the high resolution is maintained. Moreover, in the measurement, a large number of pieces of texture image data do not need to be used. Accordingly, using the texture image data makes it possible to perform the measurement related to the horizontal direction with high accuracy and at high speed.

Subsequently, the inspecting part 230 determines, by comparing the measured value obtained at Step S13 with a prescribed threshold, the quality of the measurement target S (Step S14), and ends the measurement processing. Note that, the inspecting part 230 may display the determination result at Step S14 on the display part 320, or may provide it to the external device 400.

In the abovementioned inspection processing, after the processes at Steps S1 to S8 have been executed, the processes at Steps S9 to S12 are executed, but the present invention is not limited thereto. The processes at Steps S1 to S8 may be executed after the processes at Steps S9 to S12 have been executed. Moreover, the processes at Step S8 and S12 may be executed at any time points before the measurement is executed, and may be concurrently executed with another process.

(4) Measurement Example of Measurement Target

Figure 5:
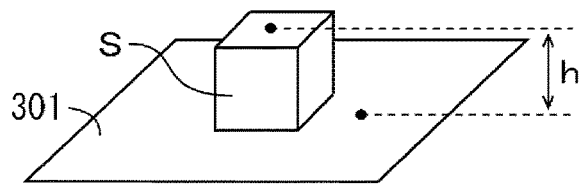
FIG. 5 is a diagram for explaining one example of measurement of a measurement target.

FIGS. 5 to 8 are diagrams for explaining one example of the measurement of the measurement target S. In the present example, as illustrated in FIG. 5, it is considered to measure a height h of the plurality of the measurement targets S that are successively conveyed by the belt conveyor 301. Note that, for easy understanding, a shape of each of the measurement targets S is assumed to be a rectangular parallelepiped. The same applies to FIGS. 9 to 12, which are described later.

Figure 6:
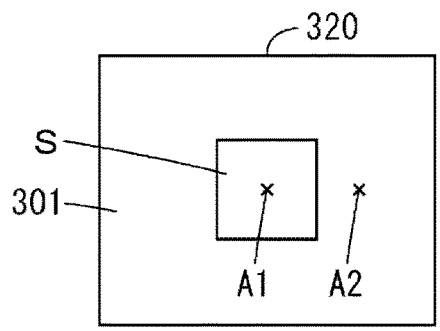
FIG. 6 is a diagram for explaining one example of the measurement of the measurement target.

A user acquires in advance reference data indicating a two-dimensional image of one measurement target S that is conveyed by the belt conveyor 301 before the inspection processing, as a reference image. As illustrated in FIG. 6, a reference image based on the reference data of the measurement target S is displayed on the display part 320. The user operates the operating part 310 in FIG. 1, thereby specifying a point A1 on a top surface of the measurement target S in the reference image and a point A2 on the belt conveyor 301.

Figure 7:
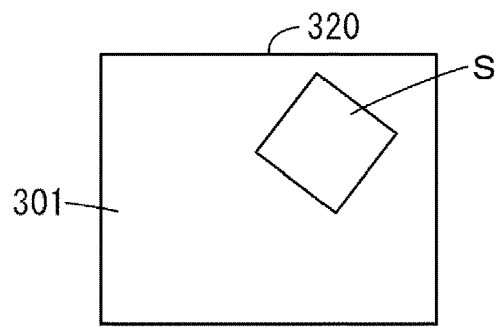
FIG. 7 is a diagram for explaining one example of the measurement of the measurement target.

Thereafter, the abovementioned inspection processing is executed, thereby height data and texture image data of the measurement target S are generated. FIG. 7 illustrates a texture image based on the texture image data of the measurement target S. As illustrated in FIG. 7, a position of the measurement target S in the reference image and a position of the measurement target S in the texture image are not necessarily corresponded with each other.

Figure 8:
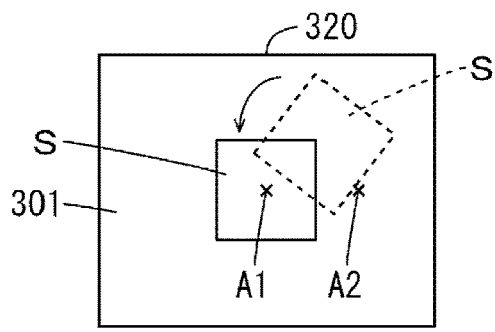
FIG. 8 is a diagram for explaining one example of the measurement of the measurement target.

Even in such a case, by performing image processing such as pattern matching, as illustrated by an arrow in FIG. 8, the inspecting part 230 associates the position of the measurement target S in the reference image with the position of the measurement target S in the texture image. Accordingly, the positions of the points A1 and A2 in the texture image are identified. Here, the texture image data has a high resolution, so that it is possible to identify the positions of the points A1 and A2 with high accuracy. Thereafter, the inspecting part 230 measures three-dimensional positions of portions respectively corresponding to the points A1 and A2 in the height image, by performing the image processing. Accordingly, the height h of the measurement target S is measured with high accuracy.

Figure 9:
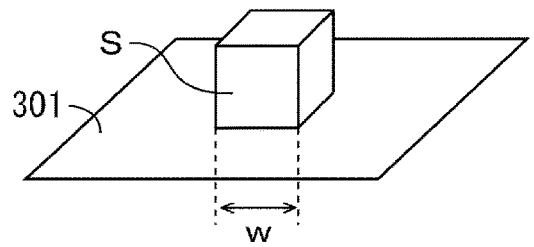
FIG. 9 is a diagram for explaining another example of measurement of the measurement target.
Figure 10:
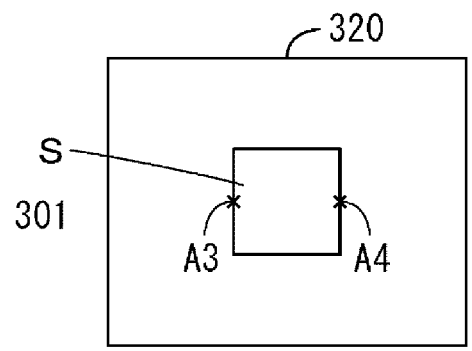
FIG. 10 is a diagram for explaining another example of the measurement of the measurement target.

FIGS. 9 to 12 are diagrams for explaining another example of the measurement of the measurement target S. In the present example, as illustrated in FIG. 9, it is considered to measure a width w of the plurality of the measurement targets S that are successively conveyed by the belt conveyor 301. Similar to the example in FIGS. 5 to 8, as illustrated in FIG. 10, before the inspection processing, a reference image of the measurement target S is displayed on the display part 320. The user operates the operating part 310, thereby specifying a point A3 on one side surface and a point A4 on the other side surface of the measurement target S in the reference image.

Figure 11:
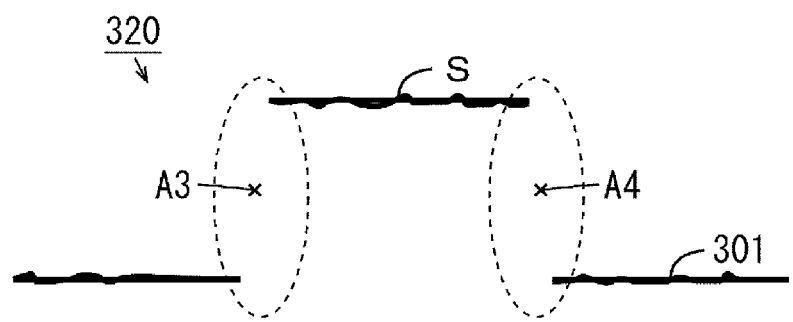
FIG. 11 is a diagram for explaining another example of the measurement of the measurement target.

Thereafter, the abovementioned inspection processing is executed, thereby height data and texture image data of the measurement target S are generated. FIG. 11 illustrates a height image based on height data of the measurement target S before the image processing. As illustrated in FIG. 11, in the height image before the image processing, a surface of the measurement target S and a surface of the belt conveyor 301 do not have flat shapes, but have minute concave-convex shapes in some cases.

Moreover, as illustrated by the dashed line in FIG. 11, height data corresponding to the vicinity of side surfaces (edge portions) of the measurement target S is not present. Accordingly, three-dimensional positions of portions corresponding to the points A3 and A4 cannot be measured. Even if the three-dimensional positions of portions corresponding to the points A3 and A4 can be measured, the measured value has a low reliability, and the relevant measured value may be probably removed as a noise.

Figure 12:
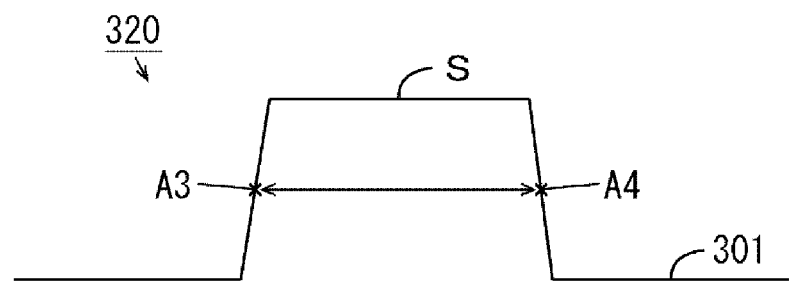
FIG. 12 is a diagram for explaining another example of the measurement of the measurement target.

In contrast, in the present embodiment, image processing such as filter processing is executed to the height data. Accordingly, averaging and filling of the height data are performed. In this case, as illustrated in FIG. 12, in the height image, the surface of the measurement target S and the surface of the belt conveyor 301 have flat shapes. Moreover, height data corresponding to the edge portions of the measurement target S is interpolated. However, characteristic portions in the X direction and the Y direction in the height data become blurred due to the filter processing. Accordingly, eventually, when the height data is used, the three-dimensional positions of portions corresponding to the points A3 and A4 cannot be measured with high accuracy.

Therefore, as the above, when the measurement related to the horizontal direction is performed, the inspecting part 230 uses texture image data, and measures two-dimensional positions of portions respectively corresponding to the points A3 and A4. In the texture image data, the high resolution is maintained, so that it is possible to measure the two-dimensional positions in the horizontal direction with high accuracy. Accordingly, the width w of the measurement target S is measured with high accuracy.

(5) Extension Processing of Height Data

Figure 13:
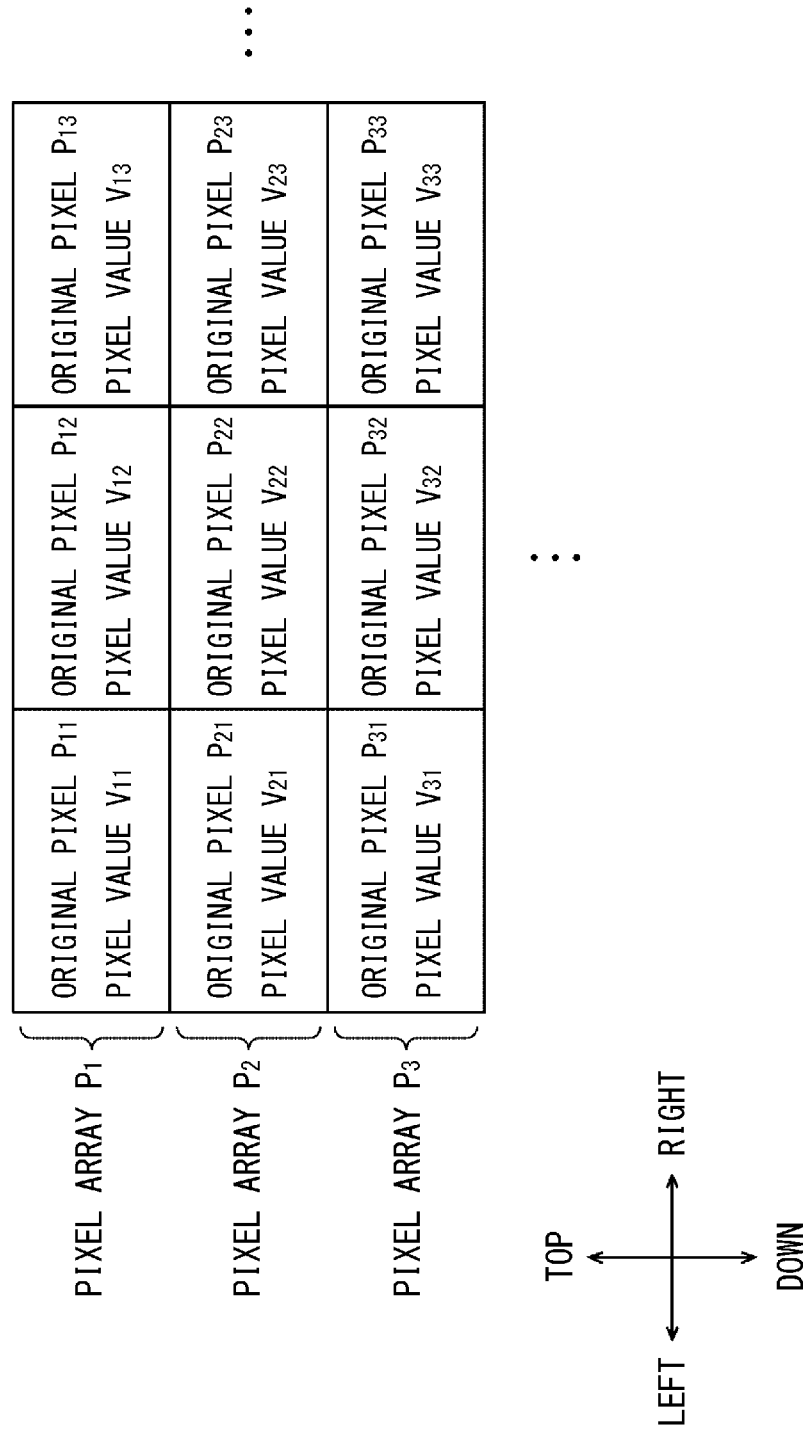
FIG. 13 is a diagram illustrating a part of height data.
Figure 14:
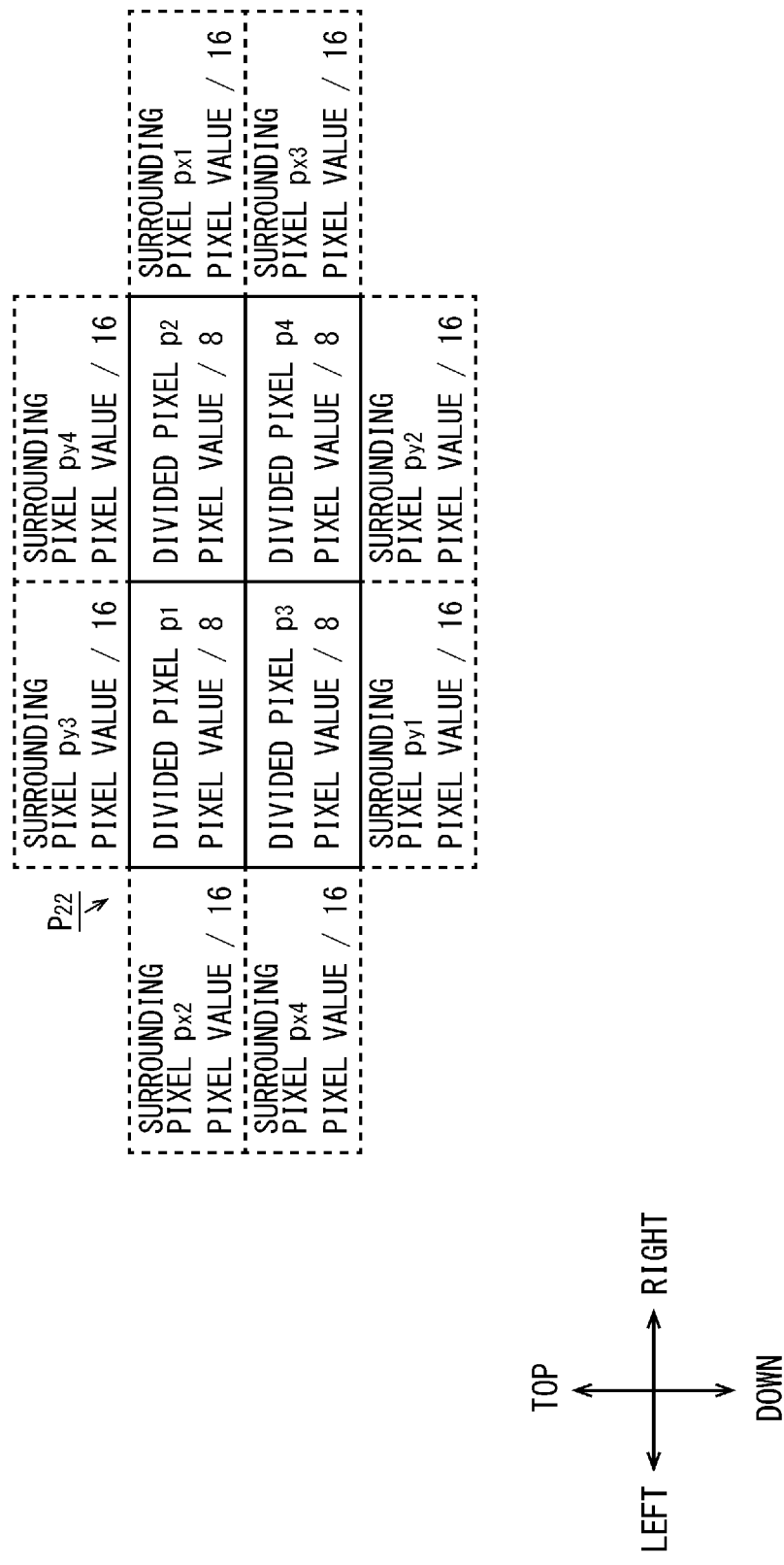
FIG. 14 is a diagram for explaining a concrete example of extension processing of height data.

FIG. 13 is a diagram illustrating a part of height data. In FIG. 13 and FIG. 14, which is described later, the left side and the right side in a plane of paper are respectively defined as the left side and the right side in data. Moreover, the up side and the down side in the plane of paper are respectively defined as the up side and the down side in the height data.

The left-and-right direction and the up-and-down direction in FIG. 13 respectively correspond to the X direction and the Y direction in FIG. 3. As illustrated in FIG. 13, in the height data, a plurality of pixels (hereinafter, referred to as original pixels) after the binning are arranged so as to align in the left-and-right direction and in the up-and-down direction.

Specifically, a plurality of pixel arrays $P_1, P_2, P_3, \ldots$ are arranged so as to align in this order from the up side to the down side. In the pixel array $P_1$, a plurality of original pixels $P_{11}, P_{12}, P_{13}, \ldots$ are arranged so as to align in this order from the left side to the right side. In the pixel array $P_2$, a plurality of original pixels $P_{21}, P_{22}, P_{23}, \ldots$ are arranged so as to align in this order from the left side to the right side. In the pixel array $P_3$, a plurality of original pixels $P_{31}, P_{32}, P_{33}, \ldots$ are arranged so as to align in this order from the left side to the right side.

Pixel values of the plurality of original pixels $P_{11}, P_{12},$ and $P_{13}$ are respectively $V_{11}, V_{12},$ and $V_{13}$. Pixel values of the plurality of original pixels $P_{21}, P_{22},$ and $P_{23}$ are respectively $V_{21}, V_{22},$ and $V_{23}$. Pixel values of the plurality of original pixels $P_{31}, P_{32},$ and $P_{33}$ are respectively $V_{31}, V_{32},$ and $V_{33}$. Note that, a pixel value of each original pixel is, for example, an average of four pixel values respectively corresponding to four pixels included in the relevant original pixel.

Here, in the image processing at Step S13 at FIG. 4, extension processing may be executed to the height data if necessary. The extension processing is processing that divides each original pixel of height data into a plurality of divided pixels, and determines pixel values of the plurality of the divided pixels, while weighting a pixel value of each original pixel, by distributing the weighted pixel values to the divided pixels of the relevant original pixel and the divided pixels in a surrounding of the relevant original pixel. FIG. 14 is a diagram for explaining a concrete example of extension processing of height data. FIG. 14 illustrates an original pixel $P_{22}$ as a representative of a plurality of original pixels.

As illustrated in FIG. 14, the extension processing is executed to the height data to divide each original pixel into a plurality of pixels each having a size the same as the size of the pixel before the binning. The divided pixels are referred to as the divided pixels $p_1$ to $p_4$. The divided pixels $p_1$ to $p_4$ respectively overlap with top-left, top-right, down-left, and down-right positions, in the original pixel. In each original pixel, a pixel value obtained by weighting a pixel value of the relevant original pixel with a first coefficient is assigned to each of the divided pixels $p_1$ to $p_4$. In the present example, the first coefficient is ⅛.

Moreover, divided pixels that are adjacent to the left side, the right side, the up side, and the down side of the divided pixels of each original pixel, and are included in original pixels adjacent to the relevant original pixel are referred to as surrounding pixels $p_{x1}$ to $p_{x4}$ and $p_{y1}$ to $p_{y0}$. Specifically, surrounding pixels $p_{x2}$ and $p_{x4}$ that are adjacent to the left side of the divided pixels $p_1$ and $p_3$ of each original pixel are divided pixels $p_2$ and $p_4$ that are included in the original pixel on the left side of the relevant original pixel. Surrounding pixels $p_{x1}$ and $p_{x3}$ that are adjacent to the right side of the divided pixels $p_2$ and $p_4$ of each original pixel are divided pixels $p_1$ and $p_3$ that are included in the original pixel on the right side of the relevant original pixel.

Similarly, surrounding pixels $p_{y3}$ and $p_{y0}$ that are adjacent to the up side of the divided pixels $p_1$ and $p_2$ of each original pixel are divided pixels $p_3$ and $p_4$ that are included in the relevant original pixel on the top side of the relevant original pixel. Surrounding pixels $p_{y1}$ and $p_{y2}$ that are adjacent to the down side of the divided pixels $p_3$ and $p_4$ of each original pixel are divided pixels $p_1$ and $p_2$ that are included in the original pixel on the down side of the relevant original pixel.

A pixel value obtained by weighting a pixel value of the relevant original pixel with a second coefficient smaller than the first coefficient is assigned to each of the surrounding pixels $p_{x1}$ to $p_{x4}$ and $p_{y1}$ to $p_{y0}$ corresponding to the respective original pixels. In the present example, the second coefficient is 1/16. In each original pixel, a pixel value of each divided pixel is determined by adding a pixel value of each divided pixel and pixel values of the surrounding pixels that correspond to the original pixels adjacent to the relevant original pixel and overlap with the relevant divided pixel.

For example, $V_{22}/8+V_{21}/16+V_{12}/16$ is obtained as a pixel value of the divided pixel $p_1$ of the original pixel $P_{22}$. $V_{22}/8+V_{23}/16+V_{12}/16$ is obtained as a pixel value of the divided pixel $p_2$ of the original pixel $P_{22}$. $V_{22}/8+V_{21}/16+V_{32}/16$ is obtained as a pixel value of the divided pixel $p_3$ of the original pixel $P_{22}$. $V_{22}/8+V_{23}/16+V_{32}/16$ is obtained as a pixel value of the divided pixel $p_4$ of the original pixel $P_{22}$. In this manner, it is possible to respectively assign different pixel values, on the basis of pixel values of the original pixels that are adjacent to each original pixel, to the plurality of the divided pixels of the relevant original pixel.

The abovementioned extension processing can cause height data and texture image data to have the equivalent number of pixels. Accordingly, in the inspection, it is possible to more easily associate the height data with the texture image data. Moreover, the resolution in the height data is improved to the same level as the resolution in the texture image data. Accordingly, even when the height data is used, it is possible to perform the measurement related to the horizontal direction with high accuracy.

(6) Modification Examples

Figure 15:
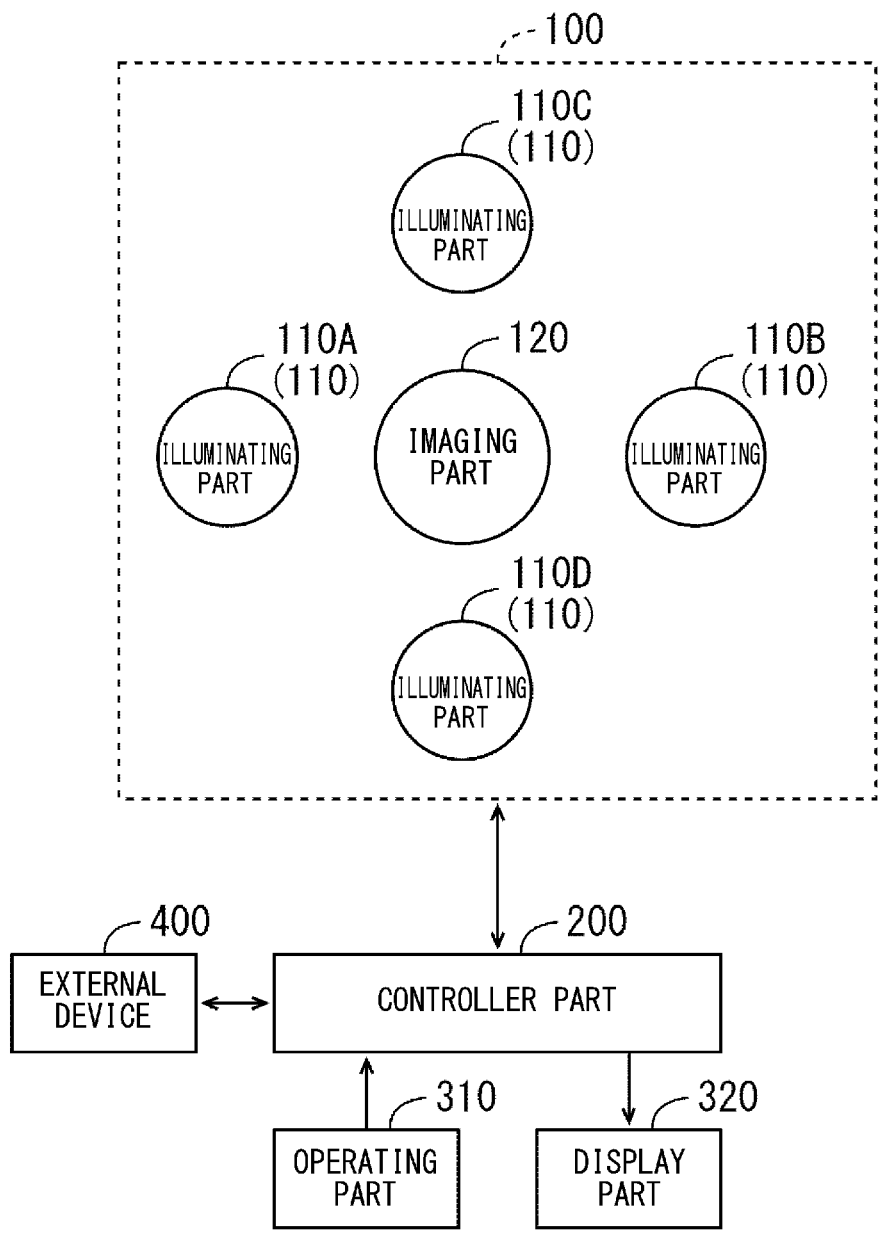
FIG. 15 is a block diagram illustrating a configuration of the inspection device according to a first modification example.

In the present embodiment, the head part 100 includes one illuminating part 110 and one imaging part 120, but the present invention is not limited thereto. FIG. 15 is a block diagram illustrating a configuration of the inspection device 300 according to a first modification example. As illustrated in FIG. 15, the head part 100 in the first modification example includes four illuminating parts 110. Note that, in FIG. 15, the illustration of the computing part 130 is omitted.

In the following explanation, when the four illuminating parts 110 are distinguished from one another, the four illuminating parts 110 are respectively referred to as illuminating parts 110A to 110D. The illuminating parts 110A to 110D mutually have the same structure, and are provided so as to surround the imaging part 120 at intervals of 90 degrees. Specifically, the illuminating part 110A and the illuminating part 110B are disposed so as to face each other by sandwiching the imaging part 120 therebetween. Moreover, the illuminating part 110C and the illuminating part 110D are disposed so as to face each other by sandwiching the imaging part 120 therebetween.

In this configuration, the four illuminating parts 110A to 110D can emit light with respect to the measurement target S from mutually different four directions. Accordingly, even when an unmeasurable portion by the light that is emitted from any of the illuminating parts 110 is present, a shape of the unmeasurable portion can be measured by the light that is emitted from another illuminating part 110. Therefore, by synthesizing height data generated corresponding to each of the four illuminating parts 110A to 110D, it is possible to generate synthesized height data with the further reduced unmeasurable portion.

Figure 16:
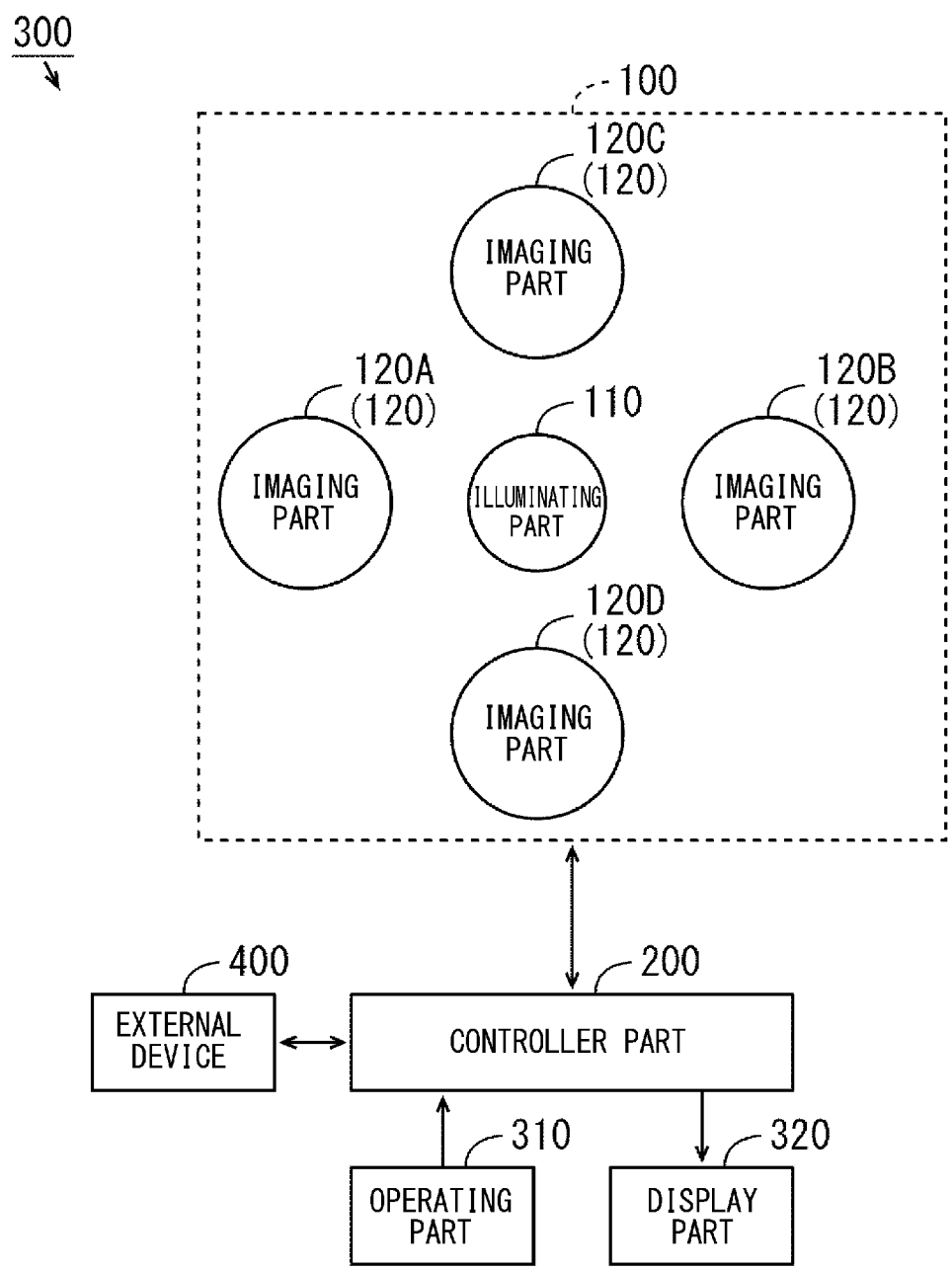
FIG. 16 is a block diagram illustrating a configuration of the inspection device according to a second modification example.

FIG. 16 is a block diagram illustrating a configuration of the inspection device 300 according to a second modification example. As illustrated in FIG. 16, the head part 100 in the second modification example includes four imaging parts 120. Note that, in FIG. 16, the illustration of the computing part 130 is omitted.

In the following explanation, when the four imaging parts 120 are distinguished, the four imaging parts 120 are respectively referred to as imaging parts 120A to 120D. The imaging parts 120A to 120D mutually have the same structure, and are provided so as to surround the illuminating part 110 at intervals of 90 degrees. Specifically, the imaging part 120A and the imaging part 120B are disposed so as to face each other by sandwiching the illuminating part 110 therebetween. Moreover, the imaging part 120C and the imaging part 120D are disposed so as to face each other by sandwiching the illuminating part 110 therebetween.

In this configuration, the four imaging parts 120A to 120D can image the measurement target S from mutually different four directions. Accordingly, even when a portion that cannot be imaged by any of the imaging parts 120, the portion that cannot be imaged can be imaged by another imaging part 120. Therefore, by synthesizing height data generated corresponding to each of the four imaging parts 120A to 120D, it is possible to generate synthesized height data with the further reduced unmeasurable portion.

In inspection processing in the first modification example, the processes at Steps S1 to S7 in the inspection processing in FIG. 4 are executed for each of the illuminating parts 110A to 110D. Similarly, in the inspection processing in the second modification example, the processes at Steps S1 to S7 in the inspection processing in FIG. 4 are executed for each of the imaging parts 120A to 120D. Moreover, in both of the modification examples, synthesized height data is generated at between Step S7 and Step S8, and the synthesized height data is output to the image memory 220 at Step S8.

Note that, in the first or second modification example, a plurality of pieces of height data are synthesized, whereby synthesized height data is generated, but the present invention is not limited thereto. No synthesized height data may be generated, and the plurality of pieces of the height data may be individually output to the image memory 220 of the controller part 200. In this case, no synthesized height data is generated at between Step S7 and Step S8.

(7) Effect

In the inspection device 300 according to the present embodiment, the illuminating part 110 irradiates the measurement target S with structured light having a cyclical pattern a plurality of times while shifting a phase. By successively receiving the structured light reflected from the measurement target S, the imaging part 120 successively generates a plurality of pieces of pattern image data indicating an image of the measurement target S. The binning processing is executed to the plurality of pieces of the pattern image data generated by the imaging part 120, and the computing processing part 132 generates, on the basis of the plurality of pieces of the pattern image data after the binning processing, height data indicating a height image of the measurement target S.

Moreover, the illuminating part 110 irradiates the measurement target S with uniform light. By receiving the uniform light reflected from the measurement target S, the imaging part 120 generates texture image data indicating an image of the measurement target S. On the basis of the height data generated by the computing processing part 132 and the texture image data generated by the imaging part 120, the inspecting part 230 executes an inspection of the measurement target S.

With this configuration, values of the plurality of the pixels are averaged due to the binning processing, so that the S/N ratio is improved. Moreover, the speed-up generation of height data is attained due to the binning processing. Accordingly, using the height data makes it possible to perform the measurement related to the height direction with high stability and at high speed. In contrast, in the texture image data, the binning processing is not performed, and the high resolution is maintained. Moreover, in the measurement, a large number of pieces of texture image data do not need to be used. Accordingly, using the texture image data makes it possible to perform the measurement related to the horizontal direction with high accuracy and at high speed.

(8) Other Embodiments (a) In the abovementioned embodiment, the structured-light illuminating part that emits structured light and the uniform-light illuminating part that emits uniform light are implemented by the common illuminating part 110, but the present invention is not limited thereto. The structured-light illuminating part and the uniform-light illuminating part may be implemented by different illuminating parts.

(b) In the abovementioned embodiment, the binning processing is not executed to the texture image data, but the present invention is not limited thereto. The binning processing at a moderate level to the extent that the resolution in the texture image data does not become lower than the resolution in the pattern image data may be executed to the texture image data.

(c) In the abovementioned embodiment, the binning processing is executed to the pattern image data such that four pixels arranged in two rows and two columns constitute one pixel, but the present invention is not limited thereto. The binning processing may be executed to the pattern image data such that two or more adjacent arbitrary pixels constitute one pixel. Moreover, in this case, in the extension processing, in accordance with the arrangement and the number of divided pixels included in the original pixel of the height data, the positions of the surrounding pixels, the first coefficient, the second coefficient, and the like are changed as appropriate from those in the example in FIG. 14.

(9) Correspondence Relation Between Each Component in Claims and Each Unit in Embodiments A correspondence example between each component in claims and each part in embodiments is explained. In the abovementioned embodiment, the measurement target S is an example of the measurement target, the illuminating part 110 is an example of the structured-light illuminating part and the uniform-light illuminating part, the imaging part 120 is an example of the imaging part, and the computing processing part 132 is an example of the computing processing part. The inspecting part 230 is an example of the inspecting part, the inspection device 300 is an example of the inspection device, the original pixels $P_{11}$ to $P_{13}$, $P_{21}$ to $P_{23}$, and $P_{31}$ to $P_{33}$ are examples of the original pixels, and the divided pixels $p_1$ to $p_4$ are examples of the divided pixels.

What is claimed is:

1. An inspection device comprising:
a structured-light illuminating part configured to irradiate a measurement target with structured light having a cyclical pattern while shifting a phase, a plurality of times;
a uniform-light illuminating part configured to irradiate the measurement target with uniform light;
an imaging part configured to successively generate, by successively receiving the structured light reflected from the measurement target, a plurality of pieces of pattern image data indicating an image of the measurement target, and generate, by receiving the uniform light reflected from the measurement target, texture image data indicating an image of the measurement target;
a computing processing part configured to generate, binning processing being executed to the plurality of pieces of the pattern image data generated by the imaging part, on the basis of the plurality of pieces of the pattern image data after the binning processing, height data indicating a height image of the measurement target; and
an inspecting part configured to execute, on the basis of the height data generated by the computing processing part or the texture image data generated by the imaging part, an inspection of the measurement target, wherein
the inspecting part inspects the measurement target by associating the height data generated by the computing processing part with the texture image data generated by the imaging part, executes the inspection of the measurement target, at an inspection related to a height direction, on the basis of the height data generated by the computing processing part, and executes the inspection of the measurement target, at an inspection related to a horizontal direction orthogonal to the height direction, on the basis of the texture image data generated by the imaging part.

2. The inspection device according to claim 1, wherein the inspecting part inspects the measurement target by acquiring reference data indicating the image of the measurement target as a reference image, receiving specifying of a measurement point on the reference image, identifying the measurement point in the texture image data or the height data by comparing the reference image data with the texture image data generated by the imaging part, and measuring the identified measurement point.

3. The inspection device according to claim 1, wherein the computing processing part divides each of original pixels of the height data into a plurality of divided pixels, and determines pixel values of the plurality of the divided pixels, while weighting a pixel value of each original pixel, by distributing the weighted pixel values to the divided pixels of the relevant original pixel and the divided pixels in a surrounding of the relevant original pixel.

4. The inspection device according to claim 3, wherein the computing processing part assigns a first pixel value obtained by weighting the pixel value of the relevant original pixel with a first coefficient, to the plurality of the divided pixels in each original pixel of the height data, and assigns a second pixel value obtained by weighting the pixel value of the relevant original pixel with a second coefficient smaller than the first coefficient, to the divided pixels in the surrounding of the relevant original pixel.

5. The inspection device according to claim 4, wherein the computing processing part divides each original pixel of the height data into a plurality of divided pixels to make a size of each of the divided pixels equivalent to a size of a pixel of the pattern image data before the binning processing.

* * * * *